(12) United States Patent
Lücke et al.

(10) Patent No.: US 11,235,372 B2
(45) Date of Patent: Feb. 1, 2022

(54) METHOD AND APPARATUS FOR THE PRODUCTION OF A TUBULAR STRUCTURE FOR A GAS GENERATOR, AND GAS GENERATOR TUBULAR STRUCTURE

(71) Applicant: Benteler Steel/Tube GmbH, Paderborn (DE)

(72) Inventors: Daniel Lücke, Paderborn (DE); Leonhard Rose, Borchen (DE); Dirk Tegethoff, Salzkotten (DE); Marcel Wellpott, Paderborn (DE)

(73) Assignee: BENTELER STEEL/TUBE GMBH, Paderborn (DE)

( * ) Notice: Subject to any disclaimer, the term of this patent is extended or adjusted under 35 U.S.C. 154(b) by 452 days.

(21) Appl. No.: 15/847,446

(22) Filed: Dec. 19, 2017

(65) Prior Publication Data
US 2018/0169732 A1 Jun. 21, 2018

(30) Foreign Application Priority Data

Dec. 20, 2016 (DE) .................. 10 2016 124 995.5

(51) Int. Cl.
*B21D 41/04* (2006.01)
*F16L 9/00* (2006.01)
(Continued)

(52) U.S. Cl.
CPC .............. *B21D 41/04* (2013.01); *F16L 9/006* (2013.01); *F16L 9/02* (2013.01); *B60R 21/26* (2013.01); *B60R 21/38* (2013.01); *B60R 22/4628* (2013.01)

(58) Field of Classification Search
CPC ....... B21D 41/00; B21D 41/04; B21D 41/045
(Continued)

(56) References Cited

U.S. PATENT DOCUMENTS 5,517,843 A * 5/1996 Winship .................. B21C 37/16
72/306
7,895,875 B2 * 3/2011 Dickson .................... B21C 5/00
72/370.02
(Continued)

FOREIGN PATENT DOCUMENTS

DE 102014018816 6/2016
EP 0 188 086 7/1986
(Continued)

OTHER PUBLICATIONS

Machine translation of JP60115339A, pp. 1-5, translated on Jan. 3, 2019. (Year: 2019).*

*Primary Examiner* — Teresa M Ekiert
(74) *Attorney, Agent, or Firm* — Henry M. Feiereisen LLC

(57) ABSTRACT

In a method of producing a tubular structure for a gas generator, a tubular body is positioned relative to a forming device having inner and outer tools, which are moved relative to an end portion of the tubular body until an inner circumferential surface of a neck of the end portion rests against a support surface of the inner tool to reduce a diameter of the end portion by a tool contour of the outer tool and thereby form a shoulder. The outer tool is held in position upon the end portion and the neck inner circumferential surface is calibrated by a calibrating surface on a calibrating member of the inner tool while an outer circumferential surface of the neck is supported by the outer tool, as the inner tool is removed from the end portion. The outer tool is then removed from the end portion of the tubular body.

5 Claims, 2 Drawing Sheets

(51) Int. Cl.
*F16L 9/02* (2006.01)
*B60R 21/26* (2011.01)
*B60R 21/38* (2011.01)
*B60R 22/46* (2006.01)

(58) Field of Classification Search
USPC ....... 72/370, 370.12, 370.13, 370.14, 370.15
See application file for complete search history.

(56) References Cited

U.S. PATENT DOCUMENTS 10,507,786 B2    12/2019  Tegethoff et al.
2004/0112113 A1    6/2004  Beagle
2015/0096346 A1*   4/2015  Kirby .......................... B21J 5/08
                                                             72/342.1

FOREIGN PATENT DOCUMENTS

JP          60115339 A *   6/1985  ............. B21D 41/00
WO     WO 97/26159     7/1997
WO     WO 2008/028059  3/2008

* cited by examiner

METHOD AND APPARATUS FOR THE PRODUCTION OF A TUBULAR STRUCTURE FOR A GAS GENERATOR, AND GAS GENERATOR TUBULAR STRUCTURE

CROSS-REFERENCES TO RELATED APPLICATIONS

This application claims the priority of German Patent Application, Serial No. 10 2016 124 995.5, filed Dec. 20, 2016, pursuant to 35 U.S.C. 119(a)-(d), the disclosure of which is incorporated herein by reference in its entirety as if fully set forth herein.

BACKGROUND OF THE INVENTION

The present invention relates to a, method and apparatus for the production of a tubular structure for a gas generator, and to a gas generator tubular structure.

The following discussion of related art is provided to assist the reader in understanding the advantages of the invention, and is not to be construed as an admission that this related art is prior art to this invention.

Tubular structures for gas generators typically find application in restraint system for vehicles, in particular occupant restraint systems of motor vehicles, and are used in airbag systems, belt tensioners or also engine hood lifting mechanisms. Tubular structures for gas generators have to withstand substantial internal pressures or operating pressures that can reach about 600 bar or higher, and thus have to meet stringent requirements when used in safety-relevant restraint systems, in particular in terms of stress resistance when the gas generator is triggered, so as to prevent the risk of uncontrolled malfunction.

It would be desirable and advantageous to address prior art shortcomings.

SUMMARY OF THE INVENTION

According to one aspect of the present invention, a method of producing a tubular structure for a gas generator includes positioning a tubular body in relation to a forming device, moving an inner tool and an outer tool of the forming device in relation to an end portion of the tubular body until an inner circumferential surface of a neck of the end portion rests against a support surface of the inner tool to reduce a diameter of the end portion by a tool contour of the outer tool and thereby form a shoulder, holding the outer tool in its position upon the end portion, calibrating the inner circumferential surface of the neck by a calibrating surface on a calibrating member of the inner tool while an outer circumferential surface of the neck is supported by the outer tool, as the inner tool is removed from the end portion, and removing the outer tool from the end portion of the tubular body.

In accordance with the present invention, tubular structures can be produced which are very durable and have superior fatigue strength. The tubular structure can be made from a tubular body of high-strength steel. Advantageously, the tubular body can be cut to size from a hot-rolled, cold-drawn and heat-treated tube string. The end portion of the tubular body is reduced in diameter and has a tapering shoulder and neck. The method according to the present invention produces tubular structures with drawn-in end portion that have improved geometry and optimized residual stress distribution in the drawn-in region. Residual stress and stress peaks in the drawn-in region are reduced. The tubular structures have homogenous fiber pattern. Any manufacture-caused discontinuities on the outer and inner circumferential surfaces of the end portion in shape and size are prevented and the risk of crack formation is decreased. Adverse effects as a result of stress peaks or stress concentration and cracks are thus effectively counteracted. As a result, structural failure is prevented at low stress level due to superimposition of residual stress with the outer load, in particular the high internal pressure when the gas generator is triggered. Furthermore, the final geometry is improved because an even wall thickness and outer diameter can be ensured in the drawn-in end portion. Springback of shaped material near the end face of the tubular body is reduced and thus bulging is prevented. As a result, refinishing works are simplified and substantially reduced.

Neutral stress conditions are encountered in the end portion of the tubular body and in the formed neck of the tubular body. This relates in particular to tangential residual stress in the neck in both at the outer circumference and the inner circumference of the neck. The tangential internal stress in particular at the outer circumference of the neck is reduced. The term "tangential" relates hereby to the circumferential direction of the neck. As a result, the risk of bulging is prevented. The neck can be formed with precise geometry and less eccentricities. In addition, the wall thickness can be adjusted in a desired manner in the end portion or neck thereof.

The removal of the outer tool from the end portion of the tubular body requires only little force.

Shaping of the neck and removal of the tubular structure from the forming device can be easily realized because of the absence of substantial friction and thus improved friction conditions. Thus, surface quality of the neck of the tubular structure is improved.

The tubular body is suitably held axially in a holding device for executing the forming process to decrease the diameter in the end portion. Drawing-in of the end portion to taper the cross section thereof is realized by the outer tool. The inner tool is graduated and has at least two sections of different diameters. The support surface is provided on the first section and supports the inner circumferential surface of the neck during the forming process. A second section of the inner tool represents the calibrating head with a calibrating surface. The calibrating head calibrates the drawn-in end portion, in particular the inner circumferential surface of the neck, when the inner tool is withdrawn from the end portion, and effects the dimensional precision. This is realized as the outer tool is mounted and fixed in its position.

According to another advantageous feature of the present invention, the inner tool and the outer tool of the forming device can be moved in relation to the end portion of the tubular body in a time-staggered sequence, with the inner tool and the calibrating member thereof being first inserted and positioned into the end portion and then moving the outer tool in relation to the end portion. The outer tool is hereby pushed over the end portion. During this movement, the diameter of the end portion is reduced and drawn-in.

According to another advantageous feature of the present invention, the inner tool and the outer tool of the forming device can be moved concurrently in relation to the end portion of the tubular body. The inner and outer tools are thus moved simultaneously. The inner tool is inserted into the end portion, while the outer tool too is shifted to thereby form the end portion.

As the neck is shaped, the inner circumferential surface of the neck progressively touches the support surface of the inner tool and slides there along. The neck is received during the relative axial movement of the support surface of the inner tool and the outer tool and the support zone provided there. The neck becomes plastically deformed as a result, with the wall thickness and length thereof increasing hereby. The wall thickness of the neck can be adjusted in the gap that is defined by the annular space between the support surface of the inner tool and the support zone of the outer tool. As a result of the plasticization of the material of the tubular body in the neck area, the tangential residual stress has a particular beneficial profile in the neck, resulting in conjunction with the calibration of the inner circumferential surface of the neck with plastic deformation of the material at the inner circumference in a high quality tubular structure with superior durability and fatigue strength.

According to another advantageous feature of the present invention, during shaping of the end portion the neck can have a wall thickness which is greater than a wall thickness of the tubular body by 5% to 25%, advantageously by 8% to 15%. This increase in wall thickness in the neck results in an increase of fatigue strength of the tubular structure and ensures a beneficial use of the involved material.

According to another aspect of the present invention, an apparatus for producing a tubular component for a gas generator includes an outer tool having a funnel-shaped tool contour, the outer tool including an entry zone, a reduction zone, and a support zone, with the tool contour tapering from the entry zone via the reduction zone to the support zone, and an inner tool including a mandrel having a calibrating member which defines a calibrating surface, the mandrel defining a support surface.

Advantageously, the support zone can have a cylindrical configuration, or may be conical in shape with incline of few degrees.

As the outer tool is pushed over the still non-deformed end portion of a tubular body, the entry zone receives the tube end. The reduction zone has a geometrically tapered configuration in the direction of the support zone. This may be the shape of a cone or conical and/or involve a curved contour.

Advantageously, the calibrating surface can be formed by an outer surface area of a cylinder section of the calibrating member.

The support surface of the mandrel is provided to support the tube end as the end portion is drawn-in to thereby form the neck. The outer circumference of the neck is hereby held and supported by the support zone in radial direction as the end portion is pulled in.

According to another advantageous feature of the present invention, the inner tool can have a mandrel bar, with the mandrel being arranged on the mandrel bar, wherein the calibrating member is defined by a diameter which is greater than a diameter of the mandrel bar. The support surface and the section of the mandrel that forms the support surface are part of the mandrel bar.

According to another advantageous feature of the present invention, the calibrating member can be arranged on the free end of the mandrel bar.

According to another advantageous feature of the present invention, the calibrating member can transition via a transition zone into the mandrel bar.

According to still another aspect of the present invention, a tubular structure for a gas generator includes a tubular body having an end portion defined by a diameter which is smaller than a remainder of the tubular body, the end portion having a tapering shoulder and a neck, with the neck having a surface with an residual stress which deviates by a maximum of 5% from an average tensile strength of a material of the tubular body, with the deviation amounting to a maximum of 50 MPa.

The production of a tubular structure in accordance with the present invention results in a compensation of residual stress in the tubular structure and in particular in the neck. The neck can be formed substantially in the absence of any adverse tangential residual stress.

Residual stress involves mechanical stress that prevails in a body when no outside forces are imposed thereon and the body assumes a thermal equilibrium. Residual stress may be caused by plastic deformation within the body. The method according to the present invention and in particular the provided support during formation of the neck and the calibration process during withdrawal of the mandrel result in a compensation and significant decrease of residual stress.

In accordance with the present invention, the neck can be formed substantially without flaws. Residual stress in the neck is neutral. This is provable and may also be measured. The neck is effectively devoid of any significant bulge formation. An axial slitting test which shows the neutralized residual stress revealed that the neck barely bulged. A method for the determination of the residual stress in the neck of the tubular structure is the standard test according to ASTM E1928-07.

In general, residual stress is determined using non-destructive or destructive methods. The destructive method (saw cut method, borehole method, ring core method) involves material under residual stress being stripped mechanically or by electric discharge machining, Released residual stress results hereby in a deformation of the surrounding material. The encountered deformation can be measured with conventional methods, for example via strain gauges.

The non-destructive methods (e.g. X-ray diffraction) involve determination of a diffraction in the metal lattice due to stress.

During production of the tubular structure, movement and pressure force at the outer tool in relation to the tube can be monitored. Practical tests have shown that the determined force values lie significantly below typical values. In this context, it is to be emphasized that the neck of a tubular body according to the present invention does not or only insignificantly widen, when the outer tool is removed.

Advantageously, the tubular body of the tubular structure for the gas generator can be made of a steel material which has a tensile strength of 750 MPa to 1,200 MPa. Currently preferred is a steel material with a tensile strength of 800 MPa to 1,050 MPa.

As the end portion is drawn-in in order to reduce the diameter, the wall of the tubular body is pushed against the support surface of the inner tool. Tangential tensile stress due to the absence of support of the forming neck is thus reduced during the drawing-in process. As a result, crack and/or flaws and also flaws during the drawing process as the tubular body is produced are eliminated or at least significantly reduced.

The present invention is able to produce tubular structures for gas generators with high dimensional precision, high capability to withstand stress, and high strength. Even narrow tolerance ranges in the region of the drawn-in end portion can be maintained.

During calibration using the calibrating head, as the inner tool is removed from the end portion, the outer tool is held in place. As a result of the fixed outer tool, the position of the tubular body is secured during the forming process, so that the need for a clamping of the tubular body that is not only complex but may adversely affect the tube surface is eliminated.

The outer tool has a continuously uniform cylindrical inner circumference in the support zone. Together with the support of the neck inside upon the support surface of the inner tool, residual stress in the neck and also in the transition from shoulder to neck can be significantly reduced. This is beneficial in particular when using the tubular structure for a gas generator.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
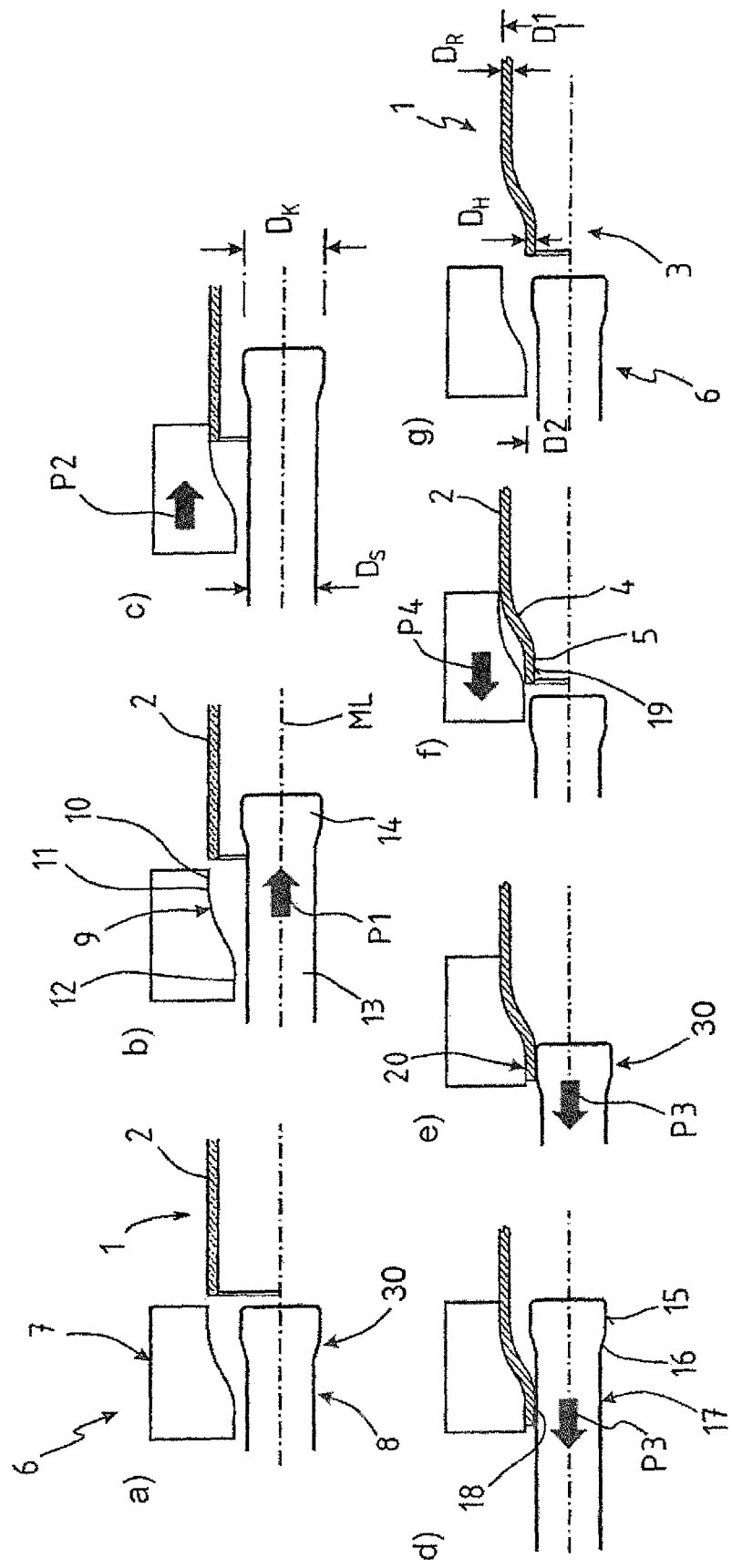
FIG. 1 is a simplified schematic illustration of seven process steps involved in a production of a tubular structure for a gas generator in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified schematic illustration of seven process steps a) to g) involved in a production of a tubular structure 1 for a gas generator in accordance with the present invention. The tubular structure 1 includes a tubular body 2 which has an end portion 3 to be pulled or drawn into a forming device 6 for reduction of the diameter, as shown in step a). The forming device 6 includes an outer tool 7 and an inner tool 8. Both, the outer and inner tools 7, 8 are shown here only by way of a cutaway detail. It will be understood by persons skilled in the art, that the outer tool 7 is configured rotation-symmetrical about a longitudinal center axis ML. This is equally true for the tubular structure 1.

The outer tool 7 has a funnel-shaped tool contour 9 which has an entry zone 10, a reduction zone 11, and a cylindrical support zone 12 which adjoins the reduction zone 11, The tool contour 9 tapers from the entry zone 10 via the reduction zone 11 in the direction of the support zone 12. The reduction zone 11 has hereby a curved course of its wall.

The inner tool 8 includes a mandrel bar 13 and a mandrel 30 arranged at a free end of the mandrel bar 13 and defining a calibrating member 14. The calibrating member 14 is cylindrical and has a calibrating surface 15 on an outer surface area thereof. The calibrating member 14 is defined by a diameter $D_K$ which is greater than a diameter $D_S$ of the mandrel bar 13. The calibrating member 14 transitions via a conical transition zone 16 into the mandrel bar 13. A section 17 of the mandrel 30 and the mandrel bar 13 defines a support surface 18 which is part of an outer circumferential surface of the mandrel bar 13.

The tubular body 2 represents the starting product for the production of the tubular structure 1. The tubular body 2 is cut to size as tube piece from a hot-rolled, cold-drawn and heat-treated tube string.

In step a), the tubular body 2 is positioned in relation to the forming device 6 and held in place by a not shown holding device.

The inner tool 8 of the forming device 6 is then moved toward a confronting end portion 3 of the tubular body 2, as shown in step b) and indicated by arrow P1, for entering the end portion 3. The calibrating member 14 of the inner tool 8 is positioned in the tubular body 2 and the inner tool 8 is held in place in this position.

Subsequently, the outer tool 7 is moved in relation to the end portion 3 in the direction of arrow P2 and pushed over the end portion 3, as shown in step c).

As the outer tool 7 moves in relation to the end portion 3, the end portion 3 is reduced in diameter by the tool contour 9 of the outer tool 7 to thereby form a shoulder 4. With progressing reduction in diameter, an inner circumferential surface 19 of a neck 5 of the end portion 3 ultimately contacts the support surface 17 of the inner tool 8. At the same time, the support zone 12 slides on the outer circumferential surface 20 of the neck 5, as shown in step d). As the end portion 3 is drawn-in, the neck 5 is supported on the inside by the support surface 18 on the mandrel bar 13 of the inner tool 8 and on the outside by the support zone 12.

Once the end portion 3 has been drawn-in, the inner tool 8 is pulled out of the end portion 3 of the tubular body 2, as indicated by left-pointing arrow P3 in steps d) and e).

As the inner tool 8 is removed, the outer tool 7 is held in place on the end portion 3. The inner circumferential surface 19 of the neck 5 is calibrated by the calibrating surface 15 that is formed on the calibrating member 14 of the inner tool 8. At the same time, the outer circumferential surface 20 of the neck 5 is supported in the support zone 12 by the outer tool 7. During calibration, the inner circumferential surface 19 of the neck 5 is slight deformed plastically and its inner dimension precisely dimensioned. The outer support in the support zone 12 of the outer tool 7 results also in a precise dimensioning of the outer circumferential surface 20 of the neck 5.

After the inner tool 8 has been removed from the end portion and calibration has been concluded, the outer tool 7 is removed from the end portion 3 of the tubular body 2, as indicated by arrow P4 in step f).

The finished end portion 3 is shown in step g), once the forming device 6 is removed. The end portion 3 of the tubular member 2 of the tubular structure 1 thus is reduced in diameter and includes the tapered shoulder 4 and the neck 5. The tubular body has an outer diameter D1 and the neck of the drawn-in end portion 3 has an outer diameter D2.

Figure 2:
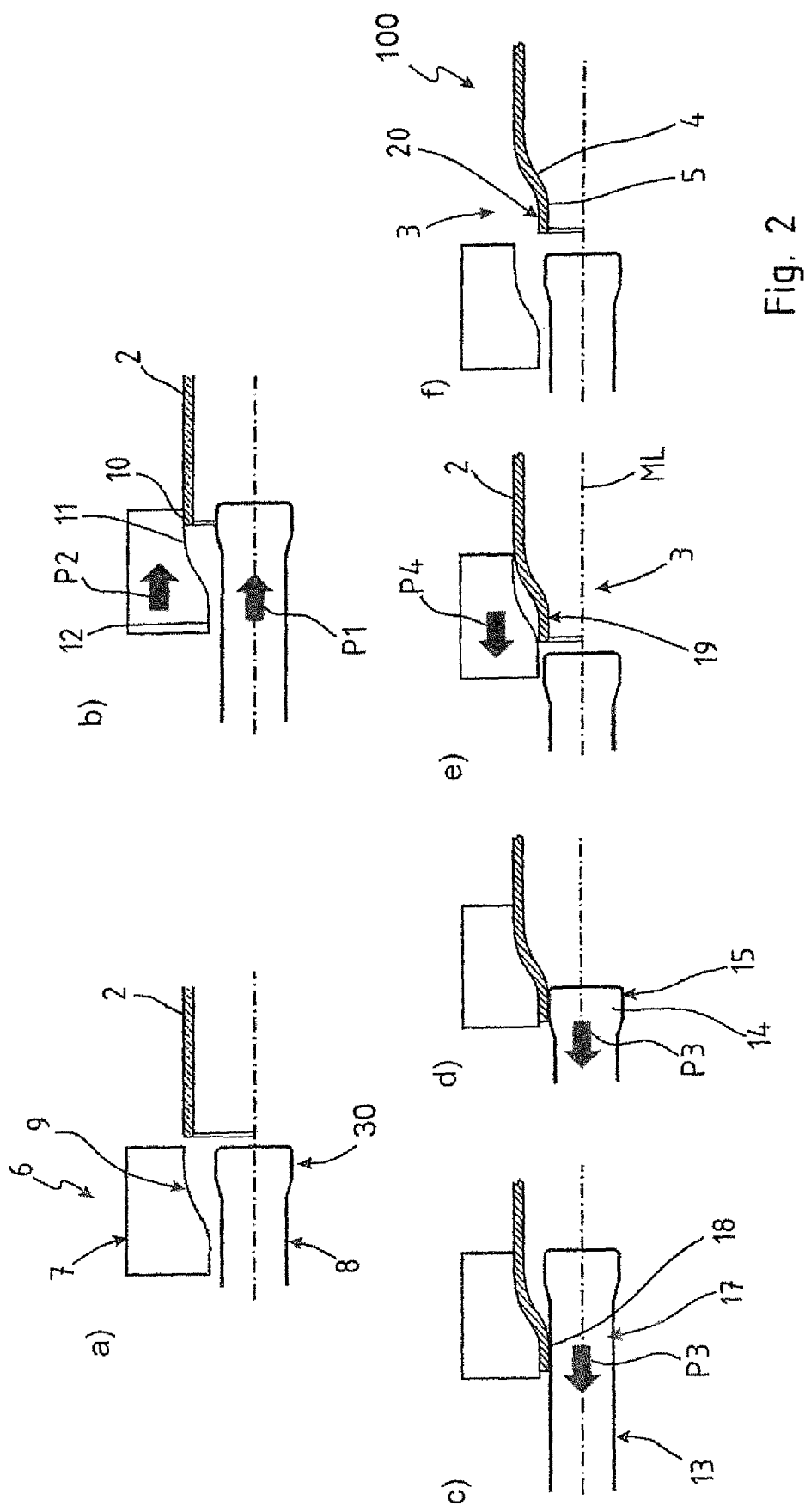
FIG. 2 is a simplified schematic illustration of six process steps involved in an alternative production of a tubular structure for a gas generator in accordance with the present invention.

Referring now to FIG. 2, there is shown a simplified schematic illustration of six process steps involved in an alternative production of a tubular structure 100 for a gas generator in accordance with the present invention. Parts corresponding with those in FIG. 1 are denoted by identical reference numerals and not explained again. This applies to steps a), c) to f) correspond to steps a), d) to g), respectively. The description below will thus center only on the differences between the embodiments.

In this embodiment, provision is made for the inner tool 8 and the outer tool 7 to be moved concurrently in relation to the end portion 3 as shown in step b) and indicated by arrows P1 and P2. The inner tool 8 enters hereby the interior of the end portion 3 (arrow P1) and is positioned there. At the same time, the outer tool 7 is moved in the direction of arrow P2 and pushed over the end portion 3. During this movement, the end portion 3 is reduced in diameter by the tool contour 9 of the outer tool 7 until the outer tool 7 has reached its end position on the end portion 3 and the inner circumferential surface 19 of the neck 5 rests upon the support surface 18 of the inner tool 8. The neck 5 is supported on the inside by the support surface 18 upon the mandrel bar 13 of the inner tool 8 and on the outside by the support zone 12 of the outer tool 7.

It will be understood by persons skilled in the art that the inner tool 8 leads the outer tool 7 when moving into the end portion 3 so that the calibrating member 14 of the inner tool 8 is prevented from colliding with the inner circumferential surface of the end portion 3 of the tubular body 2.

The mandrel bar 13 and the support surface 18 as well as the support zone 12 have a cylindrical configuration. The neck 5 is formed in the gap between outer diameter of the support surface 18 and the inner diameter of the support zone 12 and supported during the forming and calibration processes.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of producing, from a tubular body, a tubular component for a gas generator, said method comprising, in the following order:

providing a forming device having an outer tool with an inner diameter that is smaller than an outer diameter of the tubular body and an inner tool, the inner tool composed of a mandrel bar defining a support surface and a calibrating member arranged at a free end of the mandrel bar and defining a calibrating surface;

inserting the inner tool into an end portion of the tubular body;

moving the outer tool over the end portion of the tubular body and reducing the outer diameter of the end portion until an inner circumferential surface of the end portion rests against the support surface of the mandrel bar, without making contact with the calibrating member;

maintaining contact between the outer tool and the end portion having the reduced outer diameter while sliding the support surface of the inner tool along the inner circumferential surface of the end portion;

sliding the calibrating surface of the inner tool along the inner circumferential surface of the end portion while supporting the end portion having the reduced outer diameter on the outer tool, thereby calibrating the inner circumferential surface and reducing tangential tensile stress due to the absence of support of the end portion having the reduced outer diameter on the inner tool;

removing the inner tool from the end portion; and removing the outer tool from the end portion, thereby producing the tubular component with the calibrated inner circumferential surface.

2. The method of claim 1, wherein the step of inserting inner tool into the end portion is performed before the step of moving the outer tool over the end portion.

3. The method of claim 1, wherein the step of inserting the inner tool into the end portion is performed concurrently with the step of moving the outer tool over the end portion.

4. The method of claim 1, wherein the end portion has after calibration a wall thickness which is greater than a wall thickness of the tubular body by 5% to 25%.

5. The method of claim 1, wherein the end portion has after calibration a wall thickness which is greater than a wall thickness of the tubular body by 8% to 15%.

* * * * *